(12) United States Patent
Almalki et al.

(10) Patent No.: US 8,260,477 B2
(45) Date of Patent: Sep. 4, 2012

(54) METHOD AND APPARATUS FOR TRACKING CENTER OF GRAVITY OF AIR VEHICLE

(75) Inventors: Mohammad F. Almalki, Dhahran (SA); Moustafa Elshafei, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 1308 days.

(21) Appl. No.: 11/987,797

(22) Filed: Dec. 4, 2007

(65) Prior Publication Data
US 2009/0143926 A1 Jun. 4, 2009

(51) Int. Cl.
*G01M 1/02* (2006.01)
(52) U.S. Cl. ......... 701/3; 73/65.05; 73/65.06; 73/65.07; 73/170.02; 73/510; 73/511; 73/802
(58) Field of Classification Search ....... 701/3; 73/1.01, 73/65.05, 65.06, 65.07, 504.03, 504.02, 514.01, 73/510, 511, 802, 170.02
See application file for complete search history.

(56) References Cited

U.S. PATENT DOCUMENTS

| | | | |
|---|---|---|---|
| 4,545,019 A | 10/1985 | Glover | |
| 4,601,206 A | 7/1986 | Watson | |
| 4,639,872 A | 1/1987 | McHale et al. | |
| 4,935,885 A | 6/1990 | McHale et al. | |
| 4,937,754 A | 6/1990 | Buisson et al. | |
| 4,949,269 A | 8/1990 | Buisson et al. | |
| 5,034,896 A | 7/1991 | Orgun et al. | |
| 5,117,687 A * | 6/1992 | Gerardi | 73/170.15 |
| 5,136,513 A | 8/1992 | Sol et al. | |
| 5,521,827 A | 5/1996 | Lindberg et al. | |
| 5,571,953 A | 11/1996 | Wu | |
| 5,583,777 A | 12/1996 | Power | |
| 5,676,334 A | 10/1997 | Cotton et al. | |
| 5,706,196 A | 1/1998 | Romstadt | |
| 5,719,764 A * | 2/1998 | McClary | 700/79 |
| 5,878,357 A | 3/1999 | Sivashankar et al. | |
| 6,032,090 A | 2/2000 | Von Bose | |
| 6,327,526 B1 | 12/2001 | Hagan | |
| 6,634,207 B1 | 10/2003 | Lottman et al. | |
| 6,647,352 B1 | 11/2003 | Horton | |
| 6,714,851 B2 | 3/2004 | Hrovat et al. | |
| 6,853,947 B1 | 2/2005 | Horton | |
| 6,913,228 B2 | 7/2005 | Lee et al. | |
| 6,934,611 B2 | 8/2005 | McKeown et al. | |

* cited by examiner

*Primary Examiner* — John Nguyen
*Assistant Examiner* — Kyung Kim
(74) *Attorney, Agent, or Firm* — Richard C. Litman (57) ABSTRACT

The method and apparatus for tracking a center of gravity (COG) of an air vehicle provides a precise calculation and updating of the COG by disposing a plurality of acceleration measuring devices on a circumference of one or more rings in a manner that establishes redundancy in acceleration measurement. A multivariable time-space adaptive technique is provided within a high speed digital signal processor (DSP) to calculate and update the position of the COG. The system provides the capability of executing a procedure that reduces dispersion in estimating angular velocities and lateral accelerations of a moving vehicle and corrects the vehicle's estimated angular velocities and lateral accelerations. In addition, a consistency check of the measured values from the acceleration measuring devices is performed to assist in fault detection and isolation of a faulty accelerometer in the system.

16 Claims, 4 Drawing Sheets

METHOD AND APPARATUS FOR TRACKING CENTER OF GRAVITY OF AIR VEHICLE

BACKGROUND OF THE INVENTION

1. Field of the Invention

The present invention relates to guidance and control systems for vehicles in flight, and more particularly to a method and apparatus for tracking the center of gravity of an air vehicle for tracking changes in the position of the Center of Gravity (COG) due to fuel consumption or changes in payload of a vehicle in flight.

2. Description of the Related Art

Knowledge of the position of the center of gravity of an airborne vehicle is very important for accurate determination of the vehicle attitude. Knowledge of the position of the center of gravity is also essential for proper calculation of the various aerodynamic forces and torques on an aircraft or missile body, for selection of the proper control strategy, and for ensuring vehicle stability and effective guidance. However, due to the difficulty in tracking center of gravity movement during flight, many of proposed methods for attitude determination of aircraft or guidance of vehicles are normally simplified by making certain assumptions, such as that the mass of the vehicle is constant during the planned mission, or that the instruments are always located at the center of gravity (COG).

However, the migration of the COG with respect to the vehicle's fixed axis during flight could lead to serious difficulties in stabilizing and maneuvering of the aircraft. For example, in the case of fighter airplanes, the change in mass comes not only from the release of the payload, but also from fuel consumption. In the case of a tactical missile, the rapid consumption of the fuel could lead to major changes in the mass and the location of the COG of the missile.

There is a need for a method and system for determining the center of gravity of a vehicle in flight that will continuously recalculate the center of gravity in order to adjust for changes in the position of the center of gravity under the dynamic conditions of flight. Thus, a method and apparatus for tracking the center of gravity of an air vehicle solving the aforementioned problems is desired.

SUMMARY OF THE INVENTION

The aircraft center of gravity (COG) tracking system provides a precise calculation and updating of the COG by disposing a plurality of acceleration measuring devices on a circumference of one or more rings in a manner that establishes redundancy in acceleration measurement. A multivariable time-space adaptive technique is provided within a high speed digital signal processor (DSP) to calculate and update the position of the COG. The system provides the capability of executing a procedure that reduces dispersion in estimating angular velocities and lateral accelerations of a moving vehicle and corrects the vehicle's estimated angular velocities and lateral accelerations. In addition, a consistency check of the measured values from the acceleration measuring devices is performed to assist in fault detection and isolation of a faulty accelerometer in the system.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is an aircraft center of gravity (COG) tracking system that provides a precise calculation and updating of the COG by disposing a plurality of acceleration measuring devices on a circumference of one or more rings in a manner that establishes redundancy in acceleration measurement. A multivariable time-space adaptive technique is provided within a high speed digital signal processor (DSP) to calculate and update the position of the COG. Moreover, the system provides the capability of executing a procedure that reduces dispersion in estimating angular velocities and lateral accelerations of a moving vehicle and can correct the vehicle's estimated angular velocities and lateral accelerations. In addition, a consistency check of the measured values from the acceleration measuring devices is performed to assist in fault detection and isolation of a defective system accelerometer.

Figure 1:
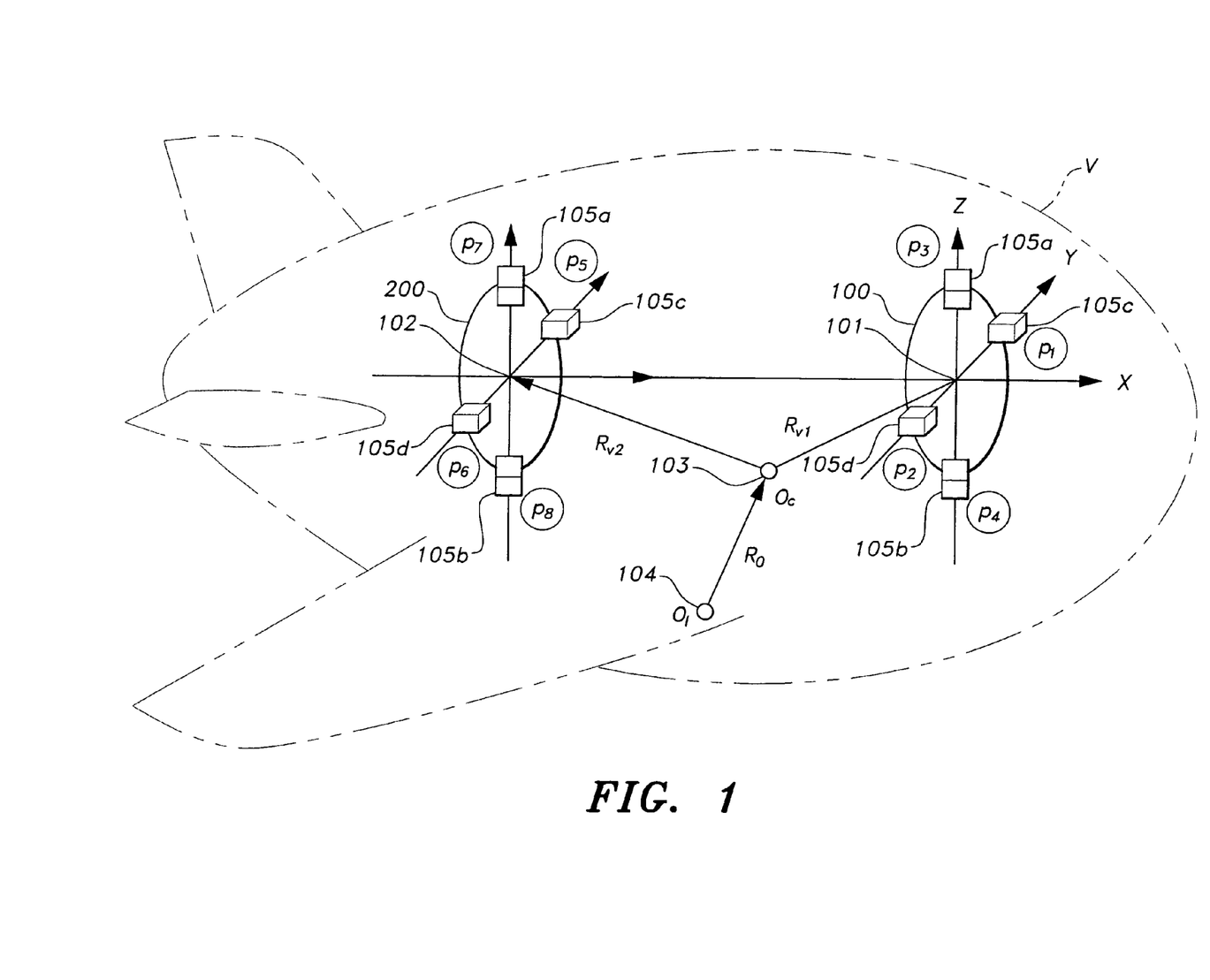
FIG. 1 is a schematic diagram of the sensor components of a method and apparatus for tracking COG of air vehicle according to the present invention, including multiple accelerometers disposed on a pair of rings mounted inside the aircraft.

As shown in FIG. 1, the system has sensors that include a plurality of distributed accelerometers fixed on the frame of a vehicle V and are aligned with respect to three Euclidean axes fixed on the frame of the vehicle. Preferably, at least two rings are provided. Ring 100 is provided at a forward position in the vehicle V and ring 200 is provided at an aft position in the vehicle V. By way of illustration, accelerometer assemblies 105a, 105b, 105c, and 105d each include three accelerometer sensors aligned orthogonally in the X, Y and Z directions. Four such accelerometer assemblies 105a, 105b, 105c, and 105d are placed at four symmetric points ($p_1$-$p_4$) (e.g., angularly spaced 90° apart) on ring 100 to define an axis origin 101. Another four accelerometer assemblies 105a, 105b, 105c, and 105d are placed at four symmetric points ($p_5$-$p_8$) (e.g., angularly spaced 90° apart) on ring 200 to define a second axis origin 102. Any additional rings would have the same symmetrical configuration of 3-axis accelerometers as rings 100 and 200. The symmetrical configuration of 3-axis accelerometers shown provides the equivalent of twelve single-axis accelerometers in each ring 100 and 200.

As noted above, within each sensor assembly 105a-105d, three mutually orthogonal sensors are placed at each point (e.g., at points $p_1$-$p_4$). The acceleration sensors within assemblies 105a-105d are aligned to be parallel to the body fixed frame axes X, Y, and Z. The center of gravity COG 103 may not coincide with the origin of the body frame of vehicle V, and it may not be known due to consumption of fuels or discharge of cargo. $R_0$ is the vector from the inertial frame 104 to the COG 103 of the vehicle V at any given moment in time.

Figure 2:
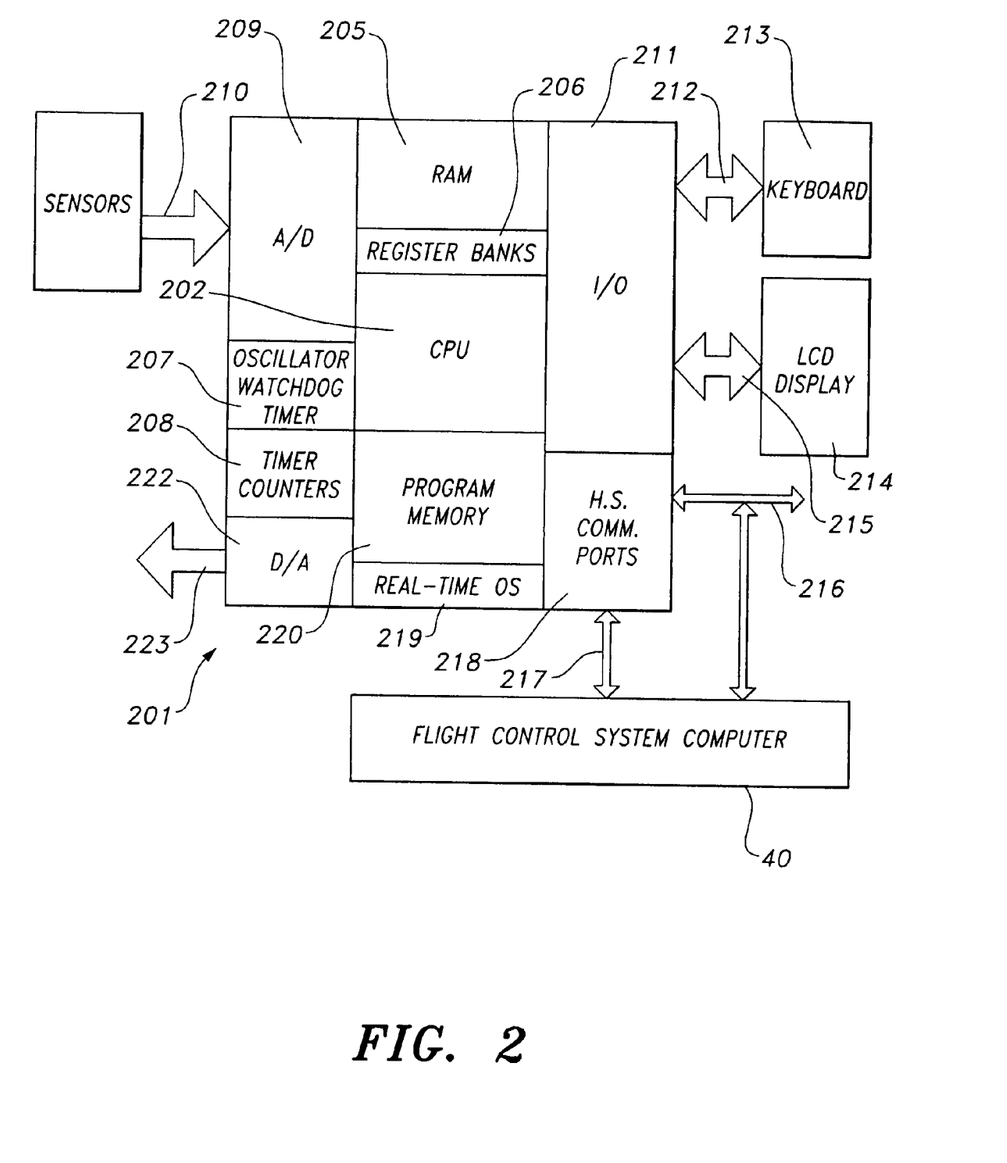
FIG. 2 is a block diagram of a method and apparatus for tracking COG of air vehicle according to the present invention.

As shown in FIG. 2, the system's sensors, which include all twelve accelerometers (three mutually orthogonal accelerometers in each of the assemblies 105a, 105b, 105c, 105d) of ring 100, and all twelve accelerometers (three mutually orthogonal accelerometers in each of assemblies 105a, 105b, 105c, 105d) of ring 200 are connected via an analog-to-digital channel 210 to a processor 201. Although the number of accelerometers placed on each ring 100, 200 is taken here to be twelve, the number of sensors is only selected as an example to demonstrate how the system consolidates sensor redundancy and how the system estimates the position of the COG 103. A greater or fewer number of accelerometers could be used, as well as different positions on the rings. The electronic circuit shown in FIG. 2 is illustrated herein by a way of example. However, it should be clear that to those skilled in the art other arrangements could be made to implement the present invention.

Preferably, the accelerometers of assemblies 105a-105d are solid state, with built in electronics to produce scaled voltage in proportion to the applied acceleration. The accelerometers of assemblies 105a-105d could be connected and grouped together via appropriate electronic circuits, or connected directly to a microcontroller and signal processing unit for sampling and processing.

The processing unit 201 is comprised of a central processing unit (CPU) 202, an analog-to-digital (A/D) converter 209, random access memory (RAM) 205, register banks 206, input/output (I/O) 211, a keyboard transfer bus 212 connected to keyboard 213, a display transfer bus 215 connected to an LCD display 214, high speed communication ports 218, real-time operating system firmware 219 residing in program memory 220, a digital-to-analog (D/A) converter 222 including D/A output channel 223, timers and counters 208, and an oscillator watchdog timer 207. At least one high speed communications port 218 of processing unit 201 is connected to a flight control system computer 40 via high speed communication links 216 and 217.

Figure 4:
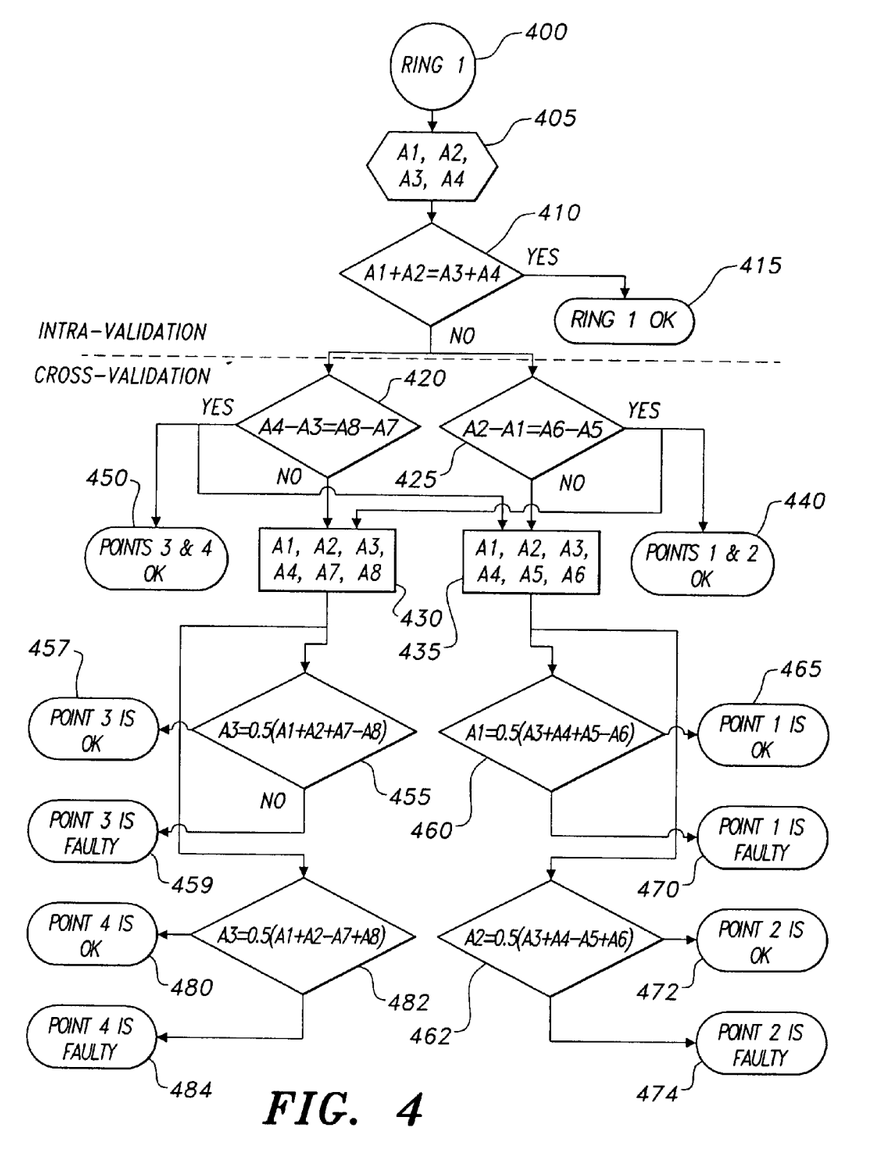
FIG. 4 is a chart of a decision tree for validation and fault detection of acceleration sensors in a method and apparatus for tracking COG of air vehicle according to the present invention.

To offload flight control system computer 40, it is preferable to use dedicated computing and signal processing unit 201 that stores and manipulates the output of the sensor assemblies 105a-105d according to method and procedure disclosed in FIG. 4. The central processing unit 202 of processor 201 could be a microprocessor core or, preferably, a high speed Digital Signal Processor core. The CPU 202 fetches instructions sequentially from the program memory 220 and executes them. The program memory 220 stores detailed computational steps, which are outlined in FIG. 4, and a stochastic estimation method. The results of execution can be stored temporarily in one or more banks of general purpose registers 206. The operating system 219 manages the execution of various tasks, and allocates memories and CPU time according to the execution priorities of various tasks.

The RAM memory 205 stores various measurements, their scaled values, and their processed and transformed values. The RAM memory 205 may have a plurality of volatile and non-volatile components. The non-volatile components store accumulated values, initial values, and vehicle parameters, positions of accelerometers with respect to the center of vehicle V, and the initial and current positions of the COG 103.

The execution timing is determined by a master CPU clock oscillator 207, which includes a watchdog timer that produces an alarm and initiates a special reset sequence if the CPU 202 halts for any reason. The timer/counter unit 208 contains a plurality of programmable digital counters, which can be programmed to provide time delays and timing sequences for sampling and for execution of other program fragments.

The Analog-to-Digital A/D unit 209 converts the signals present on the analog input channels 210 to digital words at a predetermined sampling rate. The analog input channels 210 are connected to the output signals of the distributed accelerometers of suites 105a-105d. The number of analog-to-digital channels is preferably equal to the number of accelerometers used in actual implementation of the tracking system.

The CPU 202 is internally connected to a number of digital input/output registers 206, which interface external devices via the digital I/O channels 212 and 215. The I/O digital channels 212 are connected to a keyboard 213, thereby allowing the operator to initialize operating parameters, configure the software for a particular configuration of the accelerometers, and, to test and maintain the system. The digital I/O channels 215 interface the controller 201 to a local display unit 214. The display unit displays status parameters, operating mode (online, maintenance, engineering), values invoked by the operator, error messages, and the vehicle angular velocities, angular accelerations, and lateral accelerations.

In the online mode, the measured and calculated values of the vehicle angular velocities, angular accelerations, lateral accelerations, the position of the COG 103, and other vehicle state variables are communicated at a regular rate to the vehicle flight control computer 40 via the high speed ports 218 and the high speed communication links 216 and 217. One of communication links 216 and 217 functions as a primary link, while the other acts as a backup. The secondary communication link can also be used by maintenance crews and engineers during testing and configuration of the unit 201. The high speed ports 218 implement one or more communication protocols, which may be a fieldbus protocol, a local area network, a serial communication protocol, such as RS 485 or a USB port protocol, or any other suitable communications protocol.

Figure 3:
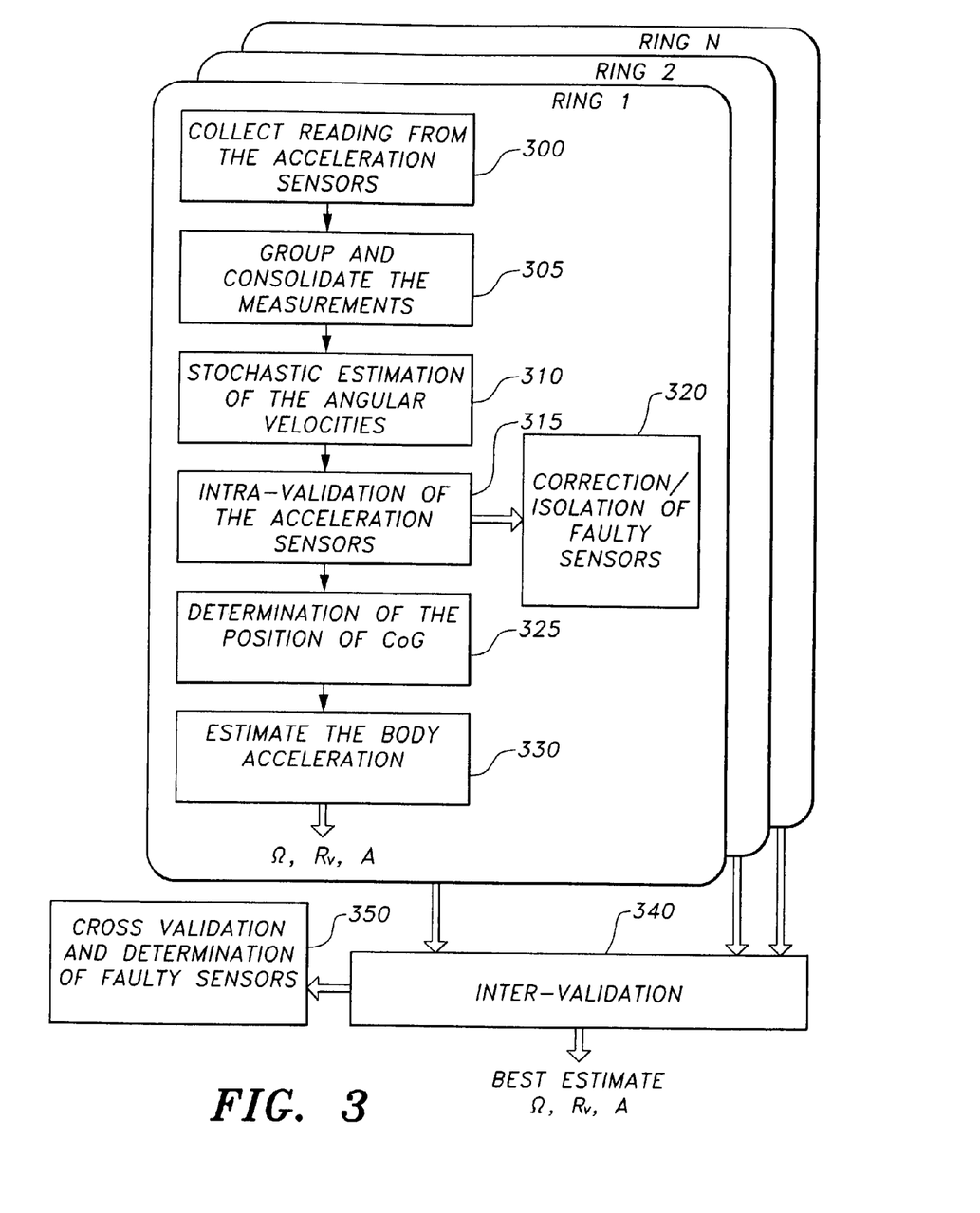
FIG. 3 is a flowchart showing operation of a method and apparatus for tracking COG of air vehicle according to the present invention.

FIG. 3 illustrates the process carried out by the system components. The execution of all steps is typically repeated at each sampling period. The sampling rate may vary, depending on the type and size of the aircraft. Typically, the sampling rate would be approximately one hundred samples per second, i.e., one sample approximately every ten milliseconds.

As shown in step 300, at the start of each sampling period the readings of the accelerometers are collected by the A/D converter unit 209. At step 305, the samples are then consolidated and grouped. Then, at step 310, an estimate of the angular velocities is performed using a stochastic estimation procedure, which is an improved structure of a Kalman filter to allow for incorporation of all the redundant measurements from all the accelerometers 105a-105d of a ring 100 or 200. At step 315, the estimated angular velocities are used for a first level intra-validation of the accelerometer outputs, and wherein, as shown in step 320, decision rules are used for the detection and correction of small sensor errors, or for isolation of grossly faulty sensors.

As shown in step 325, the angular velocities are used to compute specific matrices, and then these matrices are used in a multivariable time-space estimator to obtain a first level estimation of the COG. Then, at step 330, the calculated COG is used to calculate a first level estimate of the true body acceleration. Similar calculations are performed separately on the second ring (200), and all other redundant rings, if any.

At step 340, the first level estimation of the angular velocities, COG position, and body accelerations from all rings are processed by a second level validation step, called inter-validation wherein second level fuzzy decision rules are used to consolidate and obtain an improved second level estimate of angular velocities, COG position and body accelerations.

However, as shown at step 350, if the difference indicates a possibility of faulty or noisy measurements, the accelerometers from different rings are cross-validated in a third level of validation, and the procedure detects, corrects, or isolate the faulty sensors. The consolidated estimate of COG, angular velocities and the body acceleration are then used in a recalculation cycle and for incorporation in the subsequent estimation of the COG.

Angular velocities can be estimated by placing six accelerometers symmetrically along the three fixed-body axes at any point in the body. Each two accelerometers (along any axis) act as a rate gyro when the output of the couple is taken in the differential mode. Kalman Filter (KF) or extended KF technique is usually used to estimate the angular velocities from the noisy measurements. The method and apparatus for tracking COG of air vehicle provides an improved method, which consolidates measurements from redundant sensors. In the example provided, the number of sensors is twelve instead of the conventional six. The redundancy improves accuracy and precision of the estimated values and helps in detecting, correcting, or isolating faulty sensors. The operating equations can be derived as follows.

Assume all the accelerometers are placed symmetrically around the point m at a distance $\mu$. The total acceleration at the point P1 can be expressed as:

$$A^1 = A + \ddot{R}_v + \dot{\Omega} \times (R_v^1 + \mu \vec{j}) + 2\Omega \times \dot{R}_v^1 + \Omega \times (\Omega \times (R_v^1 + \mu \vec{j})) \quad (1)$$

$$A^1 = \begin{bmatrix} A_{x1} \\ A_{y1} \\ A_{z1} \end{bmatrix} = \begin{bmatrix} a_x \\ a_y \\ a_z \end{bmatrix} + \begin{bmatrix} \ddot{r}_x^v \\ \ddot{r}_y^v \\ \ddot{r}_z^v \end{bmatrix} + \quad (2)$$

$$2\begin{bmatrix} 0 & -\Omega_z & \Omega_y \\ \Omega_z & 0 & -\Omega_x \\ -\Omega_y & \Omega_x & 0 \end{bmatrix}\begin{bmatrix} \dot{r}_x^v \\ \dot{r}_y^v \\ \dot{r}_z^v \end{bmatrix} + \begin{bmatrix} 0 & -\dot{\Omega}_z & \dot{\Omega}_y \\ \dot{\Omega}_z & 0 & -\dot{\Omega}_x \\ -\dot{\Omega}_y & \dot{\Omega}_x & 0 \end{bmatrix}$$

$$\begin{bmatrix} r_x^v \\ r_y^v + \mu \\ r_z^v \end{bmatrix} + \begin{bmatrix} -\Omega_z^2 - \Omega_y^2 & \Omega_x\Omega_y & \Omega_x\Omega_z \\ \Omega_x\Omega_y & -\Omega_z^2 - \Omega_x^2 & \Omega_z\Omega_y \\ \Omega_x\Omega_z & \Omega_z\Omega_y & -\Omega_y^2 - \Omega_x^2 \end{bmatrix}\begin{bmatrix} r_x^v \\ r_y^v + \mu \\ r_z^v \end{bmatrix}$$

where $[a_x\ a_y\ a_z]$ is the acceleration of the body at the COG.

The acceleration as measured at point 2 is given by $$A^2 = \begin{bmatrix} A_{x1} \\ A_{y1} \\ A_{z1} \end{bmatrix} = \begin{bmatrix} a_x \\ a_y \\ a_z \end{bmatrix} + \begin{bmatrix} \ddot{r}_x^v \\ \ddot{r}_y^v \\ \ddot{r}_z^v \end{bmatrix} + \quad (3)$$

$$2\begin{bmatrix} 0 & -\Omega_z & \Omega_y \\ \Omega_z & 0 & -\Omega_x \\ -\Omega_y & \Omega_x & 0 \end{bmatrix}\begin{bmatrix} \dot{r}_x^v \\ \dot{r}_y^v \\ \dot{r}_z^v \end{bmatrix} + \begin{bmatrix} 0 & -\dot{\Omega}_z & \dot{\Omega}_y \\ \dot{\Omega}_z & 0 & -\dot{\Omega}_x \\ -\dot{\Omega}_y & \dot{\Omega}_x & 0 \end{bmatrix}$$

$$\begin{bmatrix} r_x^v \\ r_y^v - \mu \\ r_z^v \end{bmatrix} + \begin{bmatrix} -\Omega_z^2 - \Omega_y^2 & \Omega_x\Omega_y & \Omega_x\Omega_z \\ \Omega_x\Omega_y & -\Omega_z^2 - \Omega_x^2 & \Omega_z\Omega_y \\ \Omega_x\Omega_z & \Omega_z\Omega_y & -\Omega_y^2 - \Omega_x^2 \end{bmatrix}\begin{bmatrix} r_x^v \\ r_y^v - \mu \\ r_z^v \end{bmatrix}$$

The difference of the accelerations of the points P1 and P2 is then given by:

$$A^1 - A^2 = \begin{bmatrix} 0 & -\dot{\Omega}_z & \dot{\Omega}_y \\ \dot{\Omega}_z & 0 & -\dot{\Omega}_x \\ -\dot{\Omega}_y & \dot{\Omega}_x & 0 \end{bmatrix} \quad (4)$$

$$\begin{bmatrix} 0 \\ 2\mu \\ 0 \end{bmatrix} + \begin{bmatrix} -\Omega_z^2 - \Omega_y^2 & \Omega_x\Omega_y & \Omega_x\Omega_z \\ \Omega_x\Omega_y & -\Omega_z^2 - \Omega_x^2 & \Omega_z\Omega_y \\ \Omega_x\Omega_z & \Omega_z\Omega_y & -\Omega_y^2 - \Omega_x^2 \end{bmatrix}\begin{bmatrix} 0 \\ 2\mu \\ 0 \end{bmatrix}$$

The differential output of the two accelerometers on the body x-axis gives:

$$\frac{1}{2\mu}(A_{x1} - A_{x2}) = -\dot{\Omega}_z + \Omega_x\Omega_y \quad (5)$$

The differential output of the two accelerometers on the body y-axis gives:

$$\frac{1}{2\mu}(A_{y2} - A_{y1}) = \Omega_z^2 + \Omega_x^2 \quad (6)$$

The differential output of the two accelerometers on the body z-axis gives:

$$\frac{1}{2\mu}(A_{z1} - A_{z2}) = \dot{\Omega}_x + \Omega_y\Omega_z \quad (7)$$

The difference of the accelerations of the points P3 and P4 is then given by:

$$A^3 - A^4 = \begin{bmatrix} 0 & -\dot{\Omega}_z & \dot{\Omega}_y \\ \dot{\Omega}_z & 0 & -\dot{\Omega}_x \\ -\dot{\Omega}_y & \dot{\Omega}_x & 0 \end{bmatrix} \quad (8)$$

$$\begin{bmatrix} 0 \\ 0 \\ 2\mu \end{bmatrix} + \begin{bmatrix} -\Omega_z^2 - \Omega_y^2 & \Omega_x\Omega_y & \Omega_x\Omega_z \\ \Omega_x\Omega_y & -\Omega_z^2 - \Omega_x^2 & \Omega_z\Omega_y \\ \Omega_x\Omega_z & \Omega_z\Omega_y & -\Omega_y^2 - \Omega_x^2 \end{bmatrix}\begin{bmatrix} 0 \\ 0 \\ 2\mu \end{bmatrix}$$

The differential output of the two accelerometers on the body x-axis gives:

$$\frac{1}{2\mu}(A_{x3} - A_{x4}) = \dot{\Omega}_y + \Omega_x\Omega_z \quad (9)$$

The differential output of the two accelerometers on the body y-axis gives:

$$\frac{1}{2\mu}(A_{y3} - A_{y4}) = -\dot{\Omega}_x + \Omega_y\Omega_z \quad (10)$$

The differential output of the two accelerometers on the z-axis gives:

$$\frac{1}{2\mu}(A_{z4} - A_{z3}) = \Omega_y^2 + \Omega_x^2 \quad (11)$$

From (7) & (10) the state equations are $$\dot{\Omega}_x = \frac{1}{4\mu}(A_{z1} - A_{z2} - A_{y3} + A_{y4}) \quad (12)$$

$$\dot{\Omega}_y = -\Omega_x \Omega_z + \frac{1}{2\mu}(A_{x3} - A_{x4}) \quad (13)$$

$$\dot{\Omega}_z = \Omega_x \Omega_y - \frac{1}{2\mu}(A_{x1} - A_{x2}) \quad (14)$$

$$\frac{1}{2\mu}(A_{y2} - A_{y1}) = \Omega_z^2 + \Omega_x^2 \quad (15)$$

$$\frac{1}{2\mu}(A_{z4} - A_{z3}) = \Omega_y^2 + \Omega_x^2 \quad (16)$$

$$\frac{1}{2\mu}(A_{y3} - A_{y4}) + \frac{1}{2\mu}(A_{z1} - A_{z2}) = \Omega_y \Omega_z \quad (17)$$

Equations (12), (13), and (14) can be solved using a numerical method, as shown below. The obtained values for the angular velocities are then used to calculate the right hand sides of equations (15, 16, and 17) to check for the consistency of the measurement. If the values between the right hand side and the left hand sides of the equations are different by a threshold value, say 5%, a sensor failure is likely. Determination and isolation of the failed sensor is obtained by comparison with the measurements from the second ring as further explained below.

If the consistency test passed, the values of angular velocities can then be re-estimated using all the measurements by applying a Kalman filter, as described below.

Equations (12)-(17) can be discretized and linearized in the following state equations.

$$X(k+1) = A(k)X(k) + BU(k) + w(k) \quad (18)$$

$$Y(k) = C(k)X(k) + v(k) \quad (19)$$

where:

$$X = (\Omega_x, \Omega_y, \Omega_z)$$

$$U = \begin{pmatrix} \frac{1}{4\mu}(A_{z1} - A_{z2}) - \frac{1}{4\mu}(A_{y3} - A_{y4}); \\ \frac{1}{2\mu}(A_{x3} - A_{x4}); \frac{1}{2\mu}(A_{x1} - A_{x2}) \end{pmatrix}$$

$$Y(k) = \begin{pmatrix} \frac{1}{2\mu}(A_{y2} - A_{y1}); \frac{1}{2\mu}(A_{z4} - A_{z3}); \\ \frac{1}{4\mu}(A_{y3} - A_{y4}) + \frac{1}{4\mu}(A_{z1} - A_{z2}) \end{pmatrix}$$

$$A(k) = \begin{bmatrix} 1 & 0 & 0 \\ 0 & 1 & -T\Omega_x \\ 0 & T\Omega_x & 1 \end{bmatrix}$$

$$B = \begin{bmatrix} T & 0 & 0 \\ 0 & T & 0 \\ 0 & 0 & -T \end{bmatrix}$$

$$C(k) = \begin{bmatrix} \Omega_x & 0 & \Omega_z \\ \Omega_x & \Omega_y & 0 \\ 0 & \Omega_z & 0 \end{bmatrix}$$

The above set up estimation of the angular velocities using a Kalman filter proceeds as follows:
Prediction:

$$\hat{X}(k+1|k) = A(k)\hat{X}(k|k) + BU(k)$$

Correction:

$$\hat{X}(k|k) = \hat{X}(k|k-1) + K(k)(Y(k) - C\hat{X}(k|k-1))$$

where:

$$K(k) = P(k)C(k)^T(R_{yy} + C(k)P(k)C(k)^T)^{-1} \text{ and}$$

$$P(k+1) = A(k)P(k)A(k)^T + R_{xx} - A(k)P(k)C(k)^T(R_{yy} + C(k)P(k)C(k)^T)^{-1}C(k)P(k)A(k)^T$$

Similar computation is carried out on the measurements taken from the accelerometers on the second ring 200. The values obtained are compared for validation purposes, and if the estimated values are within 1% of each other, the average of the two is taken as the correct value of the angular velocities. In other words, the correct values are estimated by consolidating the outputs from twenty-four accelerometers according to the embodiment shown in FIGS. 1-4.

Estimation of the body acceleration and position of the COG 103 proceeds as follows. Adding the accelerations at points P1 and P2 results in:

$$(A^1 + A^2)/2 = \begin{bmatrix} a_x \\ a_y \\ a_z \end{bmatrix} + \begin{bmatrix} \ddot{r}_x^v \\ \ddot{r}_y^v \\ \ddot{r}_z^v \end{bmatrix} + \quad (20)$$

$$2 \begin{bmatrix} 0 & -\Omega_z & \Omega_y \\ \Omega_z & 0 & -\Omega_x \\ -\Omega_y & \Omega_x & 0 \end{bmatrix} \begin{bmatrix} \dot{r}_x^v \\ \dot{r}_y^v \\ \dot{r}_z^v \end{bmatrix} + \begin{bmatrix} 0 & -\dot{\Omega}_z & \dot{\Omega}_y \\ \dot{\Omega}_z & 0 & -\dot{\Omega}_x \\ -\dot{\Omega}_y & \dot{\Omega}_x & 0 \end{bmatrix}$$

$$\begin{bmatrix} r_x^v \\ r_y^v \\ r_z^v \end{bmatrix} + \begin{bmatrix} -\Omega_z^2 - \Omega_y^2 & \Omega_x \Omega_y & \Omega_x \Omega_z \\ \Omega_x \Omega_y & -\Omega_z^2 - \Omega_x^2 & \Omega_z \Omega_y \\ \Omega_x \Omega_z & \Omega_z \Omega_y & -\Omega_y^2 - \Omega_x^2 \end{bmatrix} \begin{bmatrix} r_x^v \\ r_y^v \\ r_z^v \end{bmatrix}$$

The above equation gives virtually the acceleration measurements by three accelerometers placed at the center of the first ring 100. It is not then surprising to find out that the same result could be obtained by adding the accelerations of points P3 and P4, i.e., $$(A^1 + A^2) = (A^4 + A^3) \quad (21)$$

Equation (21) is the basis of the first level of sensor validation. This is actually the vector form of three equations related to measurement of acceleration in the three directions. If the right hand side of Equation (21) is not equal to the left hand side within an acceptable tolerance (normal measurement noise level), a sensor fault is detected in the accelerometers in the faulty direction. To avoid a wrong decision due to noise, the readings of the two sides are compared, based on an average over a short time window.

Clearly, the acceleration of the body cannot be recovered based on the above equations because of the change of position of the center of gravity (COG) 103.

To simplify the situation, let us assume that the movement of COG 103 is much slower than the rate of change of the accelerations. In this case, we can neglect $\ddot{R}_v$ and $\dot{R}_v$. Equation (20) can then be simplified to:

$$f_{12} - (A^1 + A^2)/2 = \begin{bmatrix} a_x \\ a_y \\ a_z \end{bmatrix} + \begin{bmatrix} 0 & -\Omega_z & \Omega_y \\ \Omega_z & 0 & -\Omega_x \\ -\Omega_y & \Omega_x & 0 \end{bmatrix}$$ (22)

$$\begin{bmatrix} r_x^v \\ r_y^v \\ r_z^v \end{bmatrix} + \begin{bmatrix} -\Omega_z^2 - \Omega_y^2 & \Omega_x\Omega_y & \Omega_x\Omega_z \\ \Omega_x\Omega_y & -\Omega_z^2 - \Omega_x^2 & \Omega_z\Omega_y \\ \Omega_x\Omega_z & \Omega_z\Omega_y & -\Omega_y^2 - \Omega_x^2 \end{bmatrix} \begin{bmatrix} r_x^v \\ r_y^v \\ r_z^v \end{bmatrix}$$

In the above equation only, the body accelerations [$a_x$, $a_y$, $a_z$], and the position of first ring 100 with respect to the COG 103 are to be found. We can write equation (21) in vector form as:

$$f = A + BR^v \quad (23)$$

Where the nine elements of B can be obtained directly from the recently estimated values of the angular velocities, and $f=(A^1+A^2+A^3+A^4)/4$.

If the body acceleration is smooth, it can be described by the linear prediction formula:

$$A(t) = \sum_{j=1}^{n} D_j A(t-j) + \eta(t) \quad (24)$$

$$f(t) = A(t) + B(t)R^v \quad (25)$$

$$f(t-1) = A(t-1) + B(t-1)R^v \quad (26)$$

$$f(t-2) = A(t-2) + B(t-2)R^v \quad (27)$$

...

Multiplying equation (26) by D1, equation (27) by D2, and so on, and then summing up provides:

$$\sum_{j=1}^{n} D_j f(t-j) = \sum_{j=1}^{n} D_j A(t-j) + \sum_{j=1}^{n} D_j B(t-j) R^v \quad (28)$$

$$f(t) = \sum_{j=1}^{n} D_j f(t-j) + B(t)R^v - \sum_{j=1}^{n} D_j B(t-j) R^v + \eta(t) \quad (29)$$

The parametric model in equation (29) falls under the well known autoregressive moving average (ARMA or ARX) models. Several methods are available for estimating the parameters of this model. Here we propose an iterative technique as follows:

Step (1): Use the Linear Prediction Method (LPC) to estimate $D_j$ of the following Auto-Regressive part of the equation (29), based on the prediction model:

$$\hat{f}(t) = \sum_{j=1}^{n} D_j f(t-j) \quad (30)$$

Step (2): Compute $$E(t) = B(t) - \sum_{j=1}^{n} D_j B(t-j) \quad (31)$$

Step (3): Fix the value of E(t) and re-estimate Dj and Rv, using the prediction equation:

$$\hat{f}(t) = \sum_{j=1}^{n} D_j f(t-j) + E(t)R^v \quad (32)$$

Step (4): Repeat steps (2) and (3) until convergence of the parameters is achieved.

The body acceleration is given by rearrangement of equation (25) to $A(t)=f(t)-B(t)R^v$.

In the above procedure, if the matrices Dj are restricted to be diagonal, the algorithm can be greatly simplified. Several alternative ramifications of the above procedure are also possible, including, for example, combining the previously estimated value of Rv as an initial value in the procedure above to speed up convergence of the algorithm. Alternatively, a substantially simple version of the procedure can be devised (however, with slower convergence and less accuracy) if we use sequential adaptation in the form $R^v(t)=\alpha R^v(t-1)+\beta(t)$, where β(t) is calculated from the current measurements.

Similar calculations are performed independently for all rings. If the estimated COG 103 from all rings is within acceptable tolerance, the best estimate of the body angular velocities and accelerations will be the average of the value coming from all the rings. For example, the best estimate of the location of COG 103 with respect to ring 100 is given by $$\hat{R}^v = \frac{1}{2}[R_1^v + R_2^v - L\vec{i}]$$

for the two ring embodiment shown in FIG. 1.

The process of sensor validation and fault detection utilizes the redundancy of the sensors to validate measurement, reduce noise, and improve precision of the measurements. The validation process and the decision tree are illustrated in FIG. 4. In the first level of validation, intra-validation is performed at the ring level, using the ring's own redundancy. As shown at step 400, we illustrate the concept using the first ring, ring 100. However, the concept applies to ring 200, or any other redundant ring as well.

As shown at step 405, the accelerometers A1, A2, A3, and A4 are used. As shown at step 410, at the ring level we should have:

$$(A^1+A^2)=(A^4+A^3) \quad (33)$$

If this equality is not true within a certain consistent tolerance over a number of consecutive samples, the ring is deemed faulty. Further validation is necessary in order to determine a faulty point and faulty sensor. As shown at step 415, if the equality is true, then the ring accelerometers are valid (OK).

In the following steps, we perform intervalidation of ring 100 with ring 200. If ring 200 passes its own intravalidation test, we will use its sensors to validate ring 100 sensors as follows. It can be shown that:

$$A^2-A^1=A^6-A^5 \quad (34)$$

Similarly, we can show that:

$$A^4-A^3=A^8-A^7 \quad (35)$$

If equality (34) is true, then sensors at points $p_1$ and $p_2$ are good. If the equality is not true along one or more axes, then the sensors at $p_1$ and $p_2$ along these axes are faulty. As shown at step 425, similarly, equation (35) can be used to discover if the sensors at points 1 and 2 are faulty along one or more axes. If the equality is true, then, as shown at step 440, points 1 and 2 are valid. Moreover, as shown at step 420, equation (35) can be used to discover if the sensors at points 3 and 4 are faulty along one or more axes. If the equality is true, then, as shown at step 450, points 3 and 4 are valid. If either the test fails at step 420 or the test fails at step 425 (or if they both fail), then a third level cross-validation is performed. If the test fails at step 420, then, as shown in step 430, the cross-validation is performed using a relationship among points A1, A2, A3, A4, A7, and A8. If the test at step 425 fails, the cross-validation is performed using a relationship among points A1, A2, A3, A4, A5, and A6.

In the third level, cross-validation equations (33), (34), and (35) are used to allocate the faulty sensor.

From equations (33), (34) and (35) we get:

$$A^1 = \frac{1}{2}(A^3 + A^4 - A^6 + A^5)$$

$$A^2 = \frac{1}{2}(A^3 + A^4 + A^6 - A^5)$$

$$A^3 = \frac{1}{2}(A^1 + A^2 + A^7 - A^8)$$

$$A^3 = \frac{1}{2}(A^1 + A^2 - A^7 + A^8)$$

The above equations are used to isolate which point is faulty, and to pinpoint which sensor on which axis is faulty, as depicted in FIG. 4. For example, the cross-validation flowing from step 430 performs a point fault isolation test on point 3 at step 455 using the equality $$A^3 = \frac{1}{2}(A^1 + A^2 + A^7 - A^8).$$

If the equality is true, then, as shown at step 457, point 3 is valid. Otherwise, as shown at step 459, point 3 is faulty. Similarly, at step 482, the equality $$A^3 = \frac{1}{2}(A^1 + A^2 - A^7 + A^8)$$

is used. If the equality is true, then, as shown at step 480, point 4 is valid. Otherwise, as shown at step 484, point 4 is faulty.

Additionally, the cross-validation flowing from step 435 performs a point fault isolation test on point 1 at step 460 using the equality $$A^1 = \frac{1}{2}(A^3 + A^4 - A^6 + A^5).$$

If the equality is true, then, as shown at step 465, point 1 is valid. Otherwise, as shown at step 470, point 1 is faulty. Similarly, at step 462, the equality $$A^2 = \frac{1}{2}(A^3 + A^4 + A^6 - A^5)$$

is used. If the equality is true, then, as shown at step 472, point 2 is valid. Otherwise, as shown at step 474, point 2 is faulty.

Needless to say, using additional rings can be used to further improve the reliability of the system, where, for example, two rings can be used to validate the third one, and the measurements can be consolidated to improve the accuracy and precision of the measurements.

It is to be understood that the present invention is not limited to the embodiment described above, but encompasses any and all embodiments within the scope of the following claims.

We claim:

1. An apparatus for tracking a center of gravity of an air vehicle, comprising:
a primary set of sensor assemblies oriented for dynamically measuring at least one flight parameter and generating primary signals corresponding thereto, the primary set being adapted for measuring the flight parameter along three mutually orthogonal axes of an aircraft;
a redundant set of sensor assemblies oriented for dynamically measuring the same flight parameter as the primary set of sensor assemblies and generating redundant signals corresponding thereto, the redundant set being adapted for measuring the flight parameter along the same three mutually orthogonal axes of the aircraft as the primary set of sensor assemblies;
a signal processor connected to the primary and redundant sensor assemblies, the signal processor having:
signal sampling means for sampling the primary and redundant signals from the sensor assemblies at predetermined time intervals;
center of gravity processing means for forming a primary estimate of the center of gravity of the aircraft from the primary signals, means for forming at least one redundant estimate of the center of gravity from the redundant signals, and means for filtering out unreliable sensor signals and combining the primary and at least one redundant estimates to obtain a corrected estimate of the center of gravity at the predetermined time intervals;
guidance and control parameter processing means for dynamically calculating guidance and control parameters from the corrected center of gravity at the predetermined time intervals; and
means for high speed communication of the calculated guidance and control parameters to a flight guidance and control processor;
wherein said center of gravity processing means for forming said primary or redundant estimate comprises:
means for solving angular rate of change state equations, including:

$$\Omega_x = \frac{1}{4\mu}(A_{z1} - A_{z2} - A_{y3} + A_{y4});$$

$$\Omega_y = -\Omega_x \Omega_z + \frac{1}{2\mu}(A_{x3} - A_{x4}); \text{ and}$$

$$\Omega_z = \Omega_x \Omega_y - \frac{1}{2\mu}(A_{x1} - A_{x2}),$$

where $\Omega_x$, $\Omega_y$, and $\Omega_z$ are the x-angular velocity, y-angular velocity and z-angular velocity respectively, $\mu$ is the constant distance between said sensor assemblies and a point about which said sensor assemblies are symmetrically disposed $A_{x1}, A_{x2}, A_{x3}, A_{x4}$, are signals from x-oriented sensors placed on a first point, a second point, a third point, and a fourth point, respectively, $A_{z1}$, $A_{z2}$, are signals from z-oriented accelerometers placed on the first and second points, respectively, and $A_{y3}$ and $A_{y4}$, are signals from y-oriented sensors placed on the third and fourth points, respectively; and means for comparing right-hand sides and left-hand sides of a set of angular rate state equations, the angular rate state equations being:

$$\frac{1}{2\mu}(A_{y2} - A_{y1}) = \Omega_z^2 + \Omega_x^2$$

$$\frac{1}{2\mu}(A_{z4} - A_{z3}) = \Omega_y^2 + \Omega_x^2$$

$$\frac{1}{2\mu}(A_{y3} - A_{y4}) + \frac{1}{2\mu}(A_{z1} - A_{z2}) = \Omega_y\Omega_z,$$

where the right-hand side is evaluated based on a result of the angular rate of change solving means, $A_{z3}$, $A_{z4}$, are signals from z oriented accelerometers placed on the third and fourth points, and the $A_{y1}$, $A_{y2}$ are signals from y-oriented sensors placed on the first and second points, respectively and, at least one annular ring adapted for mounting on the aircraft, said primary set of sensor assemblies and said redundant set of sensor assemblies being symmetrically mounted on the annular ring.

2. The apparatus for tracking a center of gravity according to claim 1, wherein said at least one annular ring comprises a first annular ring and a second annular ring, the first and second annular rings being adapted for mounting in fore and aft positions in the aircraft, respectively, said primary set of sensor assemblies being mounted on one of the annular rings, the first and second annular rings having said at least one redundant set of sensor assemblies mounted thereon.

3. The apparatus for tracking a center of gravity according to claim 1, wherein said center of gravity processing means implements a time-space adaptive algorithm.

4. The apparatus for tracking a center of gravity according to claim 1, wherein said center of gravity processing means implements decision trees or fuzzy logic for determining faulty and unreliable sensor signals and combining the primary and at least one redundant estimates to obtain the corrected estimate of the center of gravity at the predetermined time intervals.

5. The apparatus for tracking a center of gravity according to claim 1, wherein each said sensor assembly comprises of three mutually orthogonal accelerometers.

6. The apparatus for tracking a center of gravity according to claim 1, wherein said means for filtering out unreliable sensor signals and combining the primary and at least one redundant estimates comprises a stochastic filter incorporating all redundant measurements from all of said sensor assemblies.

7. The apparatus for tracking a center of gravity according to claim 1, wherein said means for filtering out unreliable sensor signals and combining the primary and at least one redundant estimates comprises means for estimating angular velocities using a stochastic filter to obtain a first level estimate of angular velocities, COG position and body accelerations.

8. The apparatus for tracking a center of gravity according to claim 1, further comprising means for identifying and isolating a defective sensor among the primary and at least one redundant sensor assemblies.

9. A method for tracking a flight vehicle's center of gravity during flight, comprising the steps of:
mounting a primary set of sensor assemblies in the flight vehicle in an orientation for dynamically measuring at least one flight parameter and generating primary signals corresponding thereto, the primary set being adapted for measuring the flight parameter along three mutually orthogonal axes of an aircraft;
mounting a redundant set of sensor assemblies in the flight vehicle in an orientation for dynamically measuring the same flight parameter as the primary set of sensor assemblies and generating redundant signals corresponding thereto, the redundant set being adapted for measuring the flight parameter along the same three mutually orthogonal axes of the aircraft as the primary set of sensor assemblies;
sampling the primary and redundant signals from the sensor assemblies with a signal processor at predetermined time intervals;
forming a primary estimate of the center of gravity of the aircraft from the primary signals;
forming at least one redundant estimate of the center of gravity from the redundant signals;
filtering out unreliable sensor signals;
combining the primary and at least one redundant estimates to obtain a corrected estimate of the center of gravity at the predetermined time intervals; and
dynamically calculating guidance and control parameters from the corrected center of gravity at the predetermined time intervals;
wherein said step of forming the primary estimate of the center of gravity comprises the steps of:
solving angular rate of change state equations, including:

$$\dot{\Omega}_x = \frac{1}{4\mu}(A_{z1} - A_{z2} - A_{y3} + A_{y4});$$

$$\dot{\Omega}_y = -\Omega_x\Omega_z + \frac{1}{2\mu}(A_{x3} - A_{x4}); \text{ and}$$

$$\dot{\Omega}_z = \Omega_x\Omega_y - \frac{1}{2\mu}(A_{x1} - A_{x2}),$$

where $\Omega_x$, $\Omega_y$, and $\Omega_z$ are the x-angular velocity, y-angular velocity and z-angular velocity respectively, $\mu$ is the constant distance between said sensor assemblies and a point about which said sensor assemblies are symmetrically disposed, $A_{x1}, A_{x2}, A_{x3}, A_{x4}$, are signals from x-oriented sensors placed on a first point, a second point, a third point, and a fourth point, respectively, $A_{z1}$, $A_{z2}$, are signals from z-oriented accelerometers placed on the first and second points, respectively, and $A_{y3}$, and $A_{y4}$, are signals from y-oriented sensors placed on the third and fourth points, respectively; and
comparing right-hand sides and left-hand sides of a set of angular rate state equations, the angular rate state equations being:

$$\frac{1}{2\mu}(A_{y2} - A_{y1}) = \Omega_z^2 + \Omega_x^2$$

$$\frac{1}{2\mu}(A_{z4} - A_{z3}) = \Omega_y^2 + \Omega_x^2$$

$$\frac{1}{2\mu}(A_{y3} - A_{y4}) + \frac{1}{2\mu}(A_{z1} - A_{z2}) = \Omega_y\Omega_z,$$

where the right-hand side is evaluated based on a result of the angular rate of change solving means, $A_{z3}$, $A_{z4}$, are signals from z oriented accelerometers placed on the third and fourth points, and the $A_{y1}$, $A_{y2}$, are signals from y-oriented sensors placed on the first and second points, respectively and, at least one annular ring adapted for mounting on the aircraft, said primary set of sensor assemblies and said redundant set of sensor assemblies being symmetrically mounted on the annular ring.

10. The method for tracking a flight vehicle's center of gravity according to claim 9, further comprising the step of communicating the calculated guidance and control parameters to a flight guidance and control processor using high speed communications.

11. The method for tracking a flight vehicle's center of gravity according to claim 9, wherein said steps of mounting the primary and at least one redundant sets of sensor assemblies further comprise the steps of:
  mounting first and second annular ring annular rings at fore and aft positions, respectively, in the flight vehicle;
  mounting said primary set of sensor assemblies on one of the annular rings; and
  mounting said at least one redundant set of sensor assemblies on said first and second annular rings.

12. The method for tracking a flight vehicle's center of gravity according to claim 9, wherein said steps of filtering out unreliable sensor signals and combining the primary and at least one redundant estimates further comprise implementing a time-space adaptive algorithm.

13. The method for tracking a flight vehicle's center of gravity according to claim 9, wherein said steps of filtering out unreliable sensor signals and combining the primary and at least one redundant estimates further comprise implementing fuzzy logic to obtain the corrected estimate of the center of gravity at the predetermined time intervals.

14. The method for tracking a flight vehicle's center of gravity according to claim 9, further comprising the step of using a stochastic filter to incorporate all redundant measurements from all of said sensor assemblies.

15. The method for tracking a flight vehicle's center of gravity according to claim 9, further comprising the step of estimating angular velocities using a stochastic filter to obtain a first level estimate of angular velocities, COG position and body accelerations.

16. The method for tracking a flight vehicle's center of gravity according to claim 9, further comprising the step of identifying and isolating a defective sensor among the primary and at least one redundant sensor assemblies.

* * * * *